United States Patent
Prendergast et al.

(10) Patent No.: US 10,540,451 B2
(45) Date of Patent: Jan. 21, 2020

(54) ASSISTED LANGUAGE LEARNING

(71) Applicant: International Business Machines Corporation, Armonk, NY (US)

(72) Inventors: Orla M. Prendergast, Oranmore (IE); Michael J. Ryan, Claregalway (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/278,538

(22) Filed: Sep. 28, 2016

(65) Prior Publication Data
US 2018/0089173 A1 Mar. 29, 2018

(51) Int. Cl.
*G06F 17/28* (2006.01)
*G10L 15/00* (2013.01)

(52) U.S. Cl.
CPC .......... *G06F 17/289* (2013.01); *G10L 15/005* (2013.01)

(58) Field of Classification Search
CPC ........ G10L 15/26; G10L 21/06; G10L 21/10; G10L 15/10; G10L 13/00; G10L 2021/065; G10L 2021/105; G06F 17/289; G06F 17/28; G06F 17/2854; G06F 17/2872; G06F 17/275; G06F 9/454; G06F 17/24; G06F 17/2705; G06F 17/2809; G06F 17/2836; G06F 17/2863; G06F 17/2881; G06F 17/27; G06F 17/271; G06F 17/2735; G06F 17/2755; G06F 17/2785; G06F 17/2795; G06F 17/5022; G06F 17/5045
USPC ....... 704/231, 235, 250, 251, 255, 257, 270, 704/275, 270.1, 1–10, 277
See application file for complete search history.

(56) References Cited

U.S. PATENT DOCUMENTS 7,162,412 B2 1/2007 Yamada et al.
8,719,039 B1* 5/2014 Sharifi .................... G10L 15/08
                                                              704/231
9,195,645 B2 11/2015 Grieves et al.
(Continued)

FOREIGN PATENT DOCUMENTS

WO       2010102184 A3    9/2010

OTHER PUBLICATIONS

Alufa, Oluseun, "Is real-time translation the future of global communication?", ITProPortal, Dec. 11, 2012, 12 pages, © Future Publishing Limited Quay House, The Ambury,Bath BA1 1UA. All rights reserved. England and Wales company registration No. 2008885, <http://www.itproportal.com/2012/12/11/real-time-translator-overview/>.

(Continued)

*Primary Examiner* — Huyen X Vo
(74) *Attorney, Agent, or Firm* — Stephen R. Yoder (57) ABSTRACT

An approach for predictive translation. The approach monitors one or more audio inputs, wherein monitoring the one or more audio inputs includes collecting a plurality of audio input data from one or more audio input devices. The approach determines one or more user triggers, wherein determining includes detecting the one or more user triggers from the one or more of audio input devices. Responsive to detecting the one or more user triggers, the approach determines whether the one or more audio inputs match one or more stored phrases. Responsive to a determination that the one or more audio inputs match at least one of the one or more stored phrases, the approach presents one or more cues to the user via the audio input device.

12 Claims, 3 Drawing Sheets

(56) References Cited

U.S. PATENT DOCUMENTS

| | | | |
|---|---|---|---|
| 2004/0044517 A1* | 3/2004 | Palmquist | G06F 17/2809 704/7 |
| 2004/0123146 A1 | 6/2004 | Himmel et al. | |
| 2006/0053009 A1* | 3/2006 | Jeong | G10L 15/30 704/234 |
| 2007/0239424 A1 | 10/2007 | Payn | |
| 2008/0195376 A1 | 8/2008 | Ramer et al. | |
| 2009/0228281 A1* | 9/2009 | Singleton | G10L 15/08 704/275 |
| 2013/0262079 A1 | 10/2013 | D'Penha | |
| 2014/0337006 A1 | 11/2014 | Ma | |
| 2014/0337009 A1 | 11/2014 | Kau et al. | |
| 2018/0089172 A1* | 3/2018 | Needham | G06F 17/289 |

OTHER PUBLICATIONS

Apps, Apalon, "Speak & Translate—Free Live Voice and Text Translator with Speech Recognition", iTunes Preview, Updated: Jun. 20, 2016, Version: 2.9, Developer: IAC Search & Media Europe Ltd., © 2014-2016 IAC Search & Media Technologies Limited, 4 pages, <https://itunes.apple.com/gb/app/speak-translate-free-live/id804641004?mt=8>.

Bonin et al., "The discourse value of social signals at topic change moments", School of Computer Science and Statistics Trinity College Dublin, Ireland, INTERSPEECH 2015, Copyright © 2015 ISCA, Sep. 6-10, 2015, Dresden, Germany, pp. 1967-1971.

Brown et al., "Class-Based n-gram Models of Natural Language", IBM T.J. Watson Research Center, © 1992 Association for Computational Linguistics, vol. 18, No. 4, 14 Pages.

Gendron, Gerald R. Jr., "Natural Language Processing: A Model to Predict a Sequence of Words", Confido Consulting, Chesapeake, VA, MODSIM World 2015, 2015 Paper No. 13, 10 pages.

Kedmey, Dan, "Microsoft Is Getting Close to Perfecting a Universal Communicator", Time, Tech Innovation, Mar. 24, 2015, © 2016, Time Inc. All rights reserved, 10 pages, <http://time.com/3749465/microsoft-skype-translator/>.

Lingholic, "How many words do I need to know? The 95/5 rule in language learning, Part 2/2", How many words are there in the english language?, Copyright © 2012-1016, Lingholic, 14 pages, <http://www.lingholic.com/how-many-words-do-i-need-to-know-the-955-rule-in-language-learning-part-2/>.

Zulkernain et al., "A Mobile Intelligent Interruption Management System", Journal of Universal Computer Science, vol. 16, No. 15 (2010), 2060-2080 submitted: Jan. 31, 2010, accepted: Jul. 28, 2010, appeared: Aug. 1, 2010 © J.UCS.

"Bablefish", Babelfish.com, © 2015 BabelFish—Free Online Translator All right reserved Privacy Policy, 5 pages, <https://www.babelfish.com/>.

"Cognitive assistants for professions", To Augment and Scale Human Expertise, Cognitive Systems Institute Group, Copyright © 2016 Cognitive Systems Institute Group.All Rights Reserved, 2 pages, <http://cognitive-science.info/research-challenges/cognitive-assistants/>.

"Natural Language Processing", IBM, Last updated Jan. 12, 2016, 3 pages, <http://researcher.watson.ibm.com/researcher/view_group.php?id=147>.

"Why Tomorrow Won't Look Like Today: Things that Will Blow Your Mind", Milkeninstitute, Published on Apr. 30, 2014, 5 pages, <https://www.youtube.com/watch?v=6fJOtAzICzw#t=45m25s>.

Chu-Carroll et al. "Tracking Initiative in Collaborative Dialogue Interactions". Submitted on Apr. 17, 1997. Nine pages. <https://arxiv.org/abs/cmp-lg/9704005v1>.

Villing et al. "Interruption, Resumption and Domain Switching in In-Vehicle Dialogue" GoTAL 2008, LNAI 5221, pp. 488-499, 2008. © Springer-Verlag Berlin Heidelberg 2008. <https://link.springer.com/book/10.1007/978-3-540-85287-2>.

* cited by examiner

ASSISTED LANGUAGE LEARNING

BACKGROUND OF THE INVENTION

The present invention relates generally to the field of language processing, and more particularly to predictive interpretation and translation of conversations.

Many people may wish to learn a non-native language for a variety of reasons, such as for business, travel, or education. Traditional language courses typically focus on memorization and recitation of translated words and phrases. When learning a non-native language, a user may attempt to converse with others in the non-native language.

Some translation applications allow a user to input a word or a phrase in a native language, and the translation applications may output a literal translation in a selected non-native language. A user may use the translation applications to memorize commonly used words or phrases in preparation of conversing in the non-native language.

SUMMARY

Aspects of an embodiment of the present invention disclose a method, computer program product, and computer system for predictive translation. The method may include monitoring, by one or more computer processors, one or more audio inputs, wherein monitoring the one or more audio inputs includes collecting a plurality of audio input data from one or more audio input devices. The method may further include determining, by the one or more computer processors, one or more user triggers, wherein determining includes detecting the one or more user triggers from the one or more of audio input devices. Responsive to detecting the one or more user triggers, the method may further include determining, by the one or more computer processors, whether the one or more audio inputs match one or more stored phrases. Responsive to a determination that the one or more audio inputs match at least one of the one or more stored phrases, the method may further include presenting, by the one or more computer processors, one or more cues to the user via the audio input device.

DETAILED DESCRIPTION

Embodiments of the present invention recognize that one way to improve proficiency in a non-native language is to converse in the non-native language. When the speaker is learning a language, the speaker may have gaps in vocabulary and may pause to determine an appropriate word. The speaker may try to determine a translation of a chosen word using a dictionary or mobile application, which may take time and disrupt a conversation. Such a delay may cause the speaker to lose focus or even become frustrated when the chosen word is not readily available. This delay may also cause other participants in the conversation to lose interest and abandon the conversation. Embodiments of the present invention recognize that a quick, non-disruptive suggestion may help the speaker continue a thought with minimal interruption. Embodiments of the present invention provide the capability to detect when the speaker is stuck and discretely suggest words or phrases to the speaker without distracting the speaker from the flow of the conversation.

Embodiments of the present invention provide the ability to assist a user in learning one or more non-native languages by providing an unobtrusive suggestion when the user has difficulty speaking the non-native language.

Implementation of embodiments of the invention may take a variety of forms, and exemplary implementation details are discussed subsequently with reference to the Figures. The present invention will now be described in detail with reference to the Figures.

Figure 1:
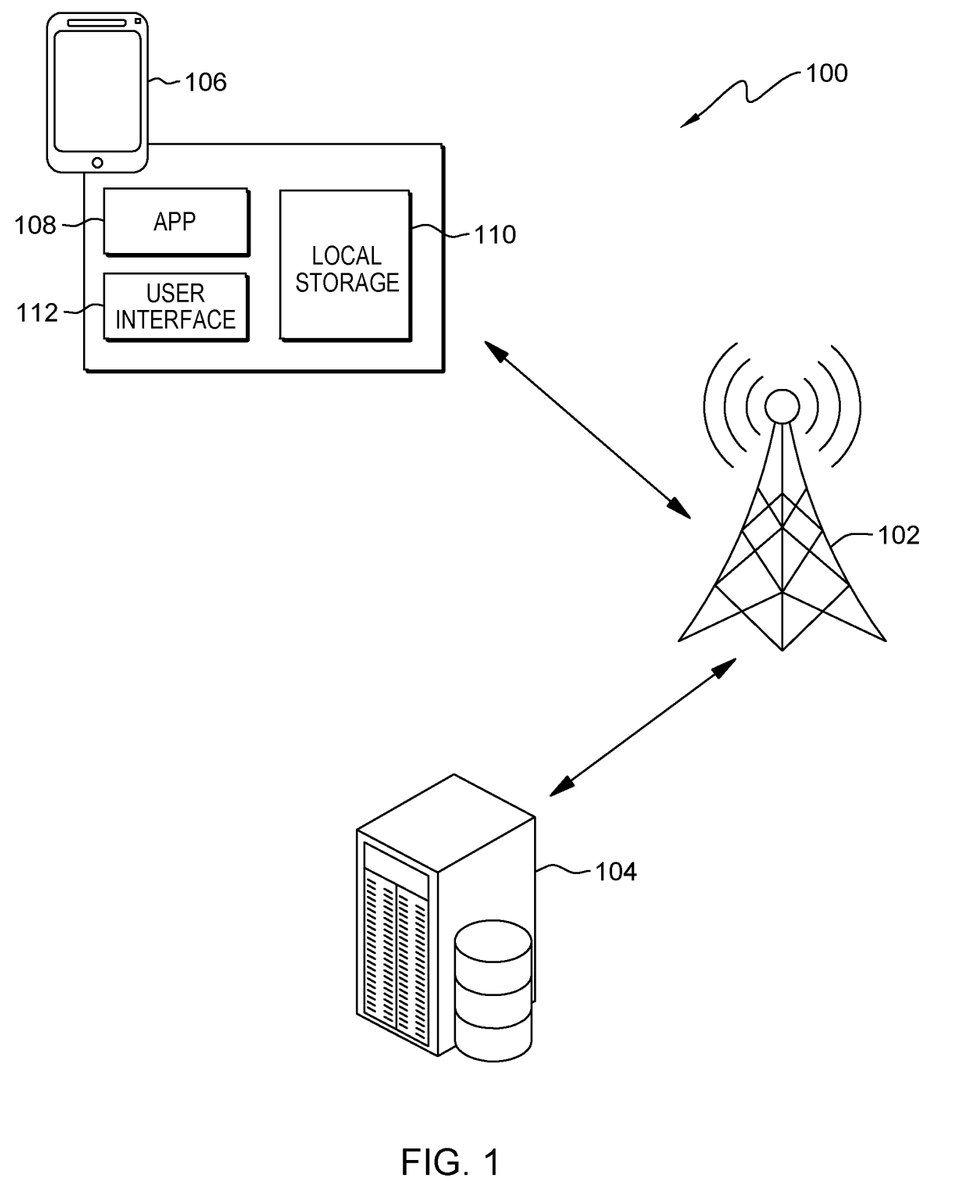
FIG. 1 is a functional block diagram illustrating a distributed data processing environment, in accordance with an embodiment of the present invention.

FIG. 1 is a functional block diagram illustrating a distributed data processing environment, generally designated 100, in accordance with some embodiments of the present invention. The term "distributed" as used in this specification describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. Distributed data processing environment 100 includes network 102, server 104, and mobile device 106.

Network 102 may be the Internet, representing a worldwide collection of networks and gateways that use TCP/IP protocols to communicate with one another. Network 102 may include wire cables, wireless communication links, cell sites, fiber optic cables, routers, switches, and/or firewalls. Server 104 and mobile device 106 may be interconnected by network 102. Network 102 can be any combination of connections and protocols capable of supporting communications between server 104, mobile device 106, predictive translation application 108, and local storage 110. Network 102 may also be implemented as a number of different types of networks, such as an intranet, a local area network (LAN), a virtual local area network (VLAN), or a wide area network (WAN). FIG. 1 is intended as an example and not as an architectural limitation for the different embodiments.

Server 104 may be, for example, a server computer system such as a management server, a web server, or any other electronic device or computing system capable of sending and receiving data. Server 104 can be a data center, consisting of a collection of networks and servers providing an IT service, such as virtual servers and applications deployed on virtual servers, to an external party. Server 104 may represent a "cloud" of computers interconnected by one or more networks, where server 104 may be a computing system utilizing clustered computers and components to act as a single pool of seamless resources when accessed through network 102. This is a common implementation for data centers in addition to cloud computing applications. In some embodiments, server 104 provides translation services to predictive translation application 108.

In some embodiments, mobile device 106 is any suitable type of mobile device capable of running mobile applications, including a smart phone, smart watch, wearable device, ear piece, tablet, slate, or any type of device that runs a mobile operating system. In other embodiments, mobile device 106 is any wearable electronic device, including wearable electronic devices affixed to eyeglasses and sunglasses, helmets, wristwatches, clothing, wigs, and the like, capable of executing programmable instructions and sending, receiving, and processing data. For example, mobile device 106 may be a wearable electronic device, such as a wristwatch, a pair of eyeglasses, or an article of clothing capable of executing a predictive translation application, such as predictive translation application 108, for monitoring a conversation and seamlessly aiding a user to determine an appropriate word or phrase on demand to use while conversing in a non-native language. Mobile device 106 may be capable of short-distance communications, such as Bluetooth® and near-field communication (NFC). As depicted in FIG. 1, mobile device 106 includes predictive translation application 108, local storage 110 and user interface 112.

Predictive translation application 108 may be a software-based application for assisting a user in learning a non-native language, operating on a mobile device, such as mobile device 106. Predictive translation application 108 may receive input from user interface 112, perform a number of operations, and return an output to user interface 112. In some embodiments, predictive translation application 108 connects to server 104 via network 102.

Predictive translation application 108 may provide the capability to monitor a conversation in a non-native language, to determine whether a user is having difficulty with the non-native language in the monitored conversation, and to discretely suggest an appropriate word or phrase to help the user complete a thought, in response to a determination that the user was having difficulty with continuing the conversation in the non-native language. The operations performed by predictive translation application 108 are discussed further in the description of FIG. 2.

In some embodiments, predictive translation application 108 is a software-based program, downloaded from a central server, such as server 104, and installed on one or more mobile devices, such as mobile device 106. In other embodiments, predictive translation application 108 operates on a central server, such as server 104, and can be utilized by one or more client devices, such as mobile device 106, via a mobile application download from the central server or a third-party application store, and executed on the one or more client devices. In yet other embodiments, predictive translation application 108 is utilized as a software service provided by a third-party cloud service provider (not shown).

Local storage 110 may be any computer readable storage medium and can be a tangible device that can retain and store instructions for use by an instruction execution device. "Local" may encompass computer readable storage mediums that are used in close proximity to mobile device 106. Examples of local storage 110 include on-board, integrated, adoptable, and expandable memory, such as an internal memory or an expansion memory of mobile device 106.

In some embodiments, user interface 112 is an audio input and output system. For example, user interface 112 may incorporate a number of microphones and speakers to record input and play output, respectively. In another example, user interface 112 may utilize one or more microphones and one or more speakers integrated within a mobile device, such as mobile device 106. In still another example, user interface 112 may utilize one or more microphones and one or more speakers in an ear piece device.

In some embodiments, user interface 112 may be a peripheral device connected to a mobile device, such as mobile device 106, via a wired or wireless connection. For example, user interface 112 may be an ear piece connected to a mobile device, such as mobile device 106.

In other embodiments, user interface 112 may display one or more notifications to visually interact with a user. For example, user interface 112 may be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation. In computers, GUIs were introduced in reaction to the perceived steep learning curve of command-line interfaces, which required commands to be typed on the keyboard. The actions in GUIs are often performed through direct manipulation of the graphics elements, for example, through swipe gestures and touch screen commands.

In some embodiments, user interface 112 may incorporate a combination of audio and video systems. For example, user interface 112 may utilize a microphone to record input and a GUI to display output.

Figure 2:
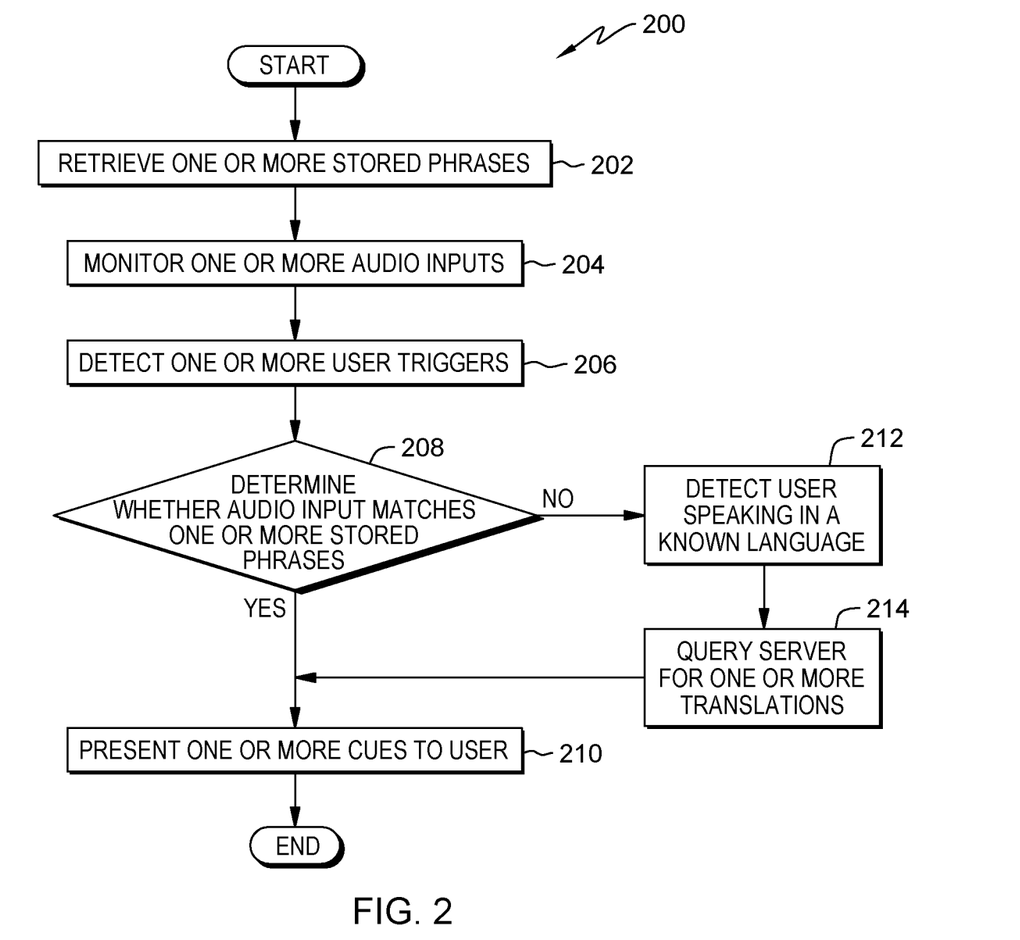
FIG. 2 is a flowchart depicting operational steps of a predictive translation application, such as the predictive interpretation application within the distributed data processing environment of FIG. 1, in accordance with an embodiment of the present invention.

FIG. 2 is a flowchart depicting operational steps of predictive translation application 108, generally designated 200, within distributed data processing environment 100 of FIG. 1, in accordance with some embodiments of the present invention. The operational steps are in an order according to some embodiments. In other embodiments, the functions noted in the flowchart can occur out of the order noted in FIG. 2. Modifications to the depicted order may be made by those skilled in the art without departing from the scope of the invention as recited by the claims.

Predictive translation application 108 retrieves one or more stored phrases (202). Predictive translation application 108 may retrieve one or more stored phrases from a local storage on a mobile device, such as local storage 110 on mobile device 106, by identifying phrases in local storage 110 for faster matching in subsequent steps. In some embodiments, predictive translation application 108 identifies all stored phrases. In other embodiments, predictive translation application 108 identifies a set of words or phrases from the list of stored phrases. For example, predictive translation application 108 may identify a set of user-selected phrases, such as phrases the user has selected to practice, or predictive translation application 108 may identify a default set of words or phrases. In still other embodiments, predictive translation application 108 may retrieve a set of relevant words or phrases using contextual indicators, such as location data, calendar entries, phrases spoken in the current conversation, and language spoken in the current conversation. For example, where a native, or known, language of a user is English, predictive translation application 108 may retrieve a set of Irish Gaelic words or phrases upon detection that a user is speaking in Irish Gaelic (non-native language). In another example, predictive translation application 108 may retrieve a set of words or phrases related to a topic or location, such as words or phrases related to "school" upon detection that a user is located near a school.

In some embodiments, the stored phrases are phrases that were previously stored by predictive translation application 108. For example, predictive translation application 108 may store default phrases based on one or more languages selected by a user, or predictive translation application 108 could store phrases with which the user has had difficulty in previous conversations.

Predictive translation application 108 monitors one or more audio inputs (204). Predictive translation application 108 may monitor one or more audio inputs by collecting audio input data, such as a recording of a user speaking a phrase, from one or more audio input devices, such as a microphone. For example, predictive translation application 108 may record one or more phrases or partial phrases, spoken by a user, through a microphone via user interface 112. In some embodiments, predictive translation application 108 may begin and end monitoring the audio inputs based on interaction by a user via user interface 112. For example, predictive translation application 108 may begin or end monitoring the audio input in response to a user manually initiating monitoring activity via a button or screen of user interface 112. In other embodiments, predictive translation application 108 may begin and end monitoring the audio inputs without user interaction. For example, predictive translation application 108 may begin or end monitoring the audio inputs based on contextual indicators, such as location data, calendar entries, spoken phrases, or language spoken. In another example, predictive translation application 108 may begin monitoring the audio inputs when a calendar entry for a meeting with a teacher starts and a user is located near a school. In yet other embodiments, predictive translation application 108 may begin or end monitoring the audio inputs utilizing both with user interaction and without user interaction. For example, predictive translation application 108 may begin monitoring the audio input when a user arrives at a specific location, and predictive translation application 108 may stop monitoring the audio input when a user interacts with user interface 112.

In some embodiments, predictive translation application 108 may process the audio input data to identify words and phrases of the audio content, and may determine the language in which the audio content is generated. For example, predictive translation application 108 may process the audio input data by converting audio input data to computer-readable text. In another example, predictive translation application 108 may process the audio input data by implementing natural language processing (NLP) to determine the linguistic meaning of the audio input data.

In some embodiments, predictive translation application 108 may store the audio input data in local storage, such as local storage 110, for future use. For example, predictive translation application 108 may compile a list of phrases most frequently used by a user.

Predictive translation application 108 detects one or more user triggers (206). In some embodiments, predictive translation application 108 may detect user triggers by monitoring the audio inputs for specific keys from a user, such as a keyword, key phrase, a pause of at least a predetermined duration, or speaking in a native language. For example, predictive translation application 108 may detect specific trigger words or trigger phrases spoken by a user, such as "uh," "um," or other filler words or the phrase "what is the word for . . . ", indicating the user may need assistance completing a portion of a conversation. In another example, predictive translation application 108 may detect a user speaking in a native language, indicating a need to determine a particular word or phrase in non-native language. In yet another example, predictive translation application 108 may detect a user mispronouncing a word, or using an incorrect word. In still another example, predictive translation application 108 may detect a pause in a conversation exceeding a predetermined threshold of time, such as a user being silent for more than three seconds, without completing the current portion of a conversation.

In other embodiments, predictive translation application 108 may detect user triggers by detecting user input via user interface 112. For example, predictive translation application 108 may detect a user tapping on a screen or shaking mobile device 106.

In some embodiments, predictive translation application 108 may select default triggers. In other embodiments, predictive translation application 108 may receive a user selection of which triggers to detect. For example, a user may select triggers from a list of possible user triggers, and may input predetermined settings, such as a duration of a pause in speech that serves as a trigger. In still other embodiments, predictive translation application 108 may select one or more user triggers to detect without user interaction, based on contextual indicators, such as location data, calendar entries, spoken phrases, and language spoken. For example, predictive translation application 108 may select user triggers based on a calendar entry regarding a meeting. In yet other embodiments, predictive translation application 108 may select user triggers with a combination of the above embodiments. For example, a user may select to have predictive translation application 108 detect a screen interaction trigger when a user is near a work location.

Predictive translation application 108 determines whether audio input matches one or more stored phrases (208). Predictive translation application 108 may determine whether the monitored audio input associated with a detected trigger matches one or more stored phrases by matching the monitored audio input to phrases stored in local storage 110. For example, predictive translation application 108 may determine that an audio input of "What time will the children be back from the" is a match to a stored phrase "What time will the children be back from the pet farm?"

In some embodiments, predictive translation application 108 narrows the search scope using contextual indicators, such as location data, calendar entries, spoken phrases, and language spoken. For example, predictive translation application 108 may detect a calendar entry regarding a school trip to the pet farm and narrow the search scope to phrases related to the trip, and predictive translation application 108 will determine that an audio input of "What time will the children be back from the" is a match to a stored phrase "What time will the children be back from the pet farm?" and exclude a stored phrase "What time will the children be back from the basketball game?", based on the monitored audio content and the calendar entry. In another example, predictive translation application 108 may detect phrases spoken by a user, or other participants, in a current conversation, related to "basketball," and predictive translation application 108 may determine that an audio input of "What time will the children be back from the" is a match to a stored phrase "What time will the children be back from the basketball game?" and may exclude a stored phrase "What time will the children be back from the pet farm?"

In some embodiments, predictive translation application 108 uses natural language processing (NLP) to match the linguistic meaning of an audio input to the linguistic meaning of a stored phrase. For example, predictive translation application 108 may determine that an audio input of "When will the kids be back from the" is a match to a stored phrase of "What time will the children be back from the pet farm?"

Predictive translation application 108 may also determine whether audio input matches stored phrases using a combination of the above embodiments. For example, predictive translation application 108 may use NLP to determine that an audio input of "When will the kids be back from the" is a match to "What time will the children be back from the pet farm?" and exclude "What time will the children be back from the basketball game?" using a contextual indicator, such as a user calendar entry regarding a school trip to a pet farm.

In response to a determination that one or more audio inputs match one or more stored phrases ("YES" branch, 208), predictive translation application 108 may present one or more cues to a user (210). In some embodiments, predictive translation application 108 presents one or more cues to a user by outputting audio through user interface 112. For example, predictive translation application 108 may play an audio recording in a non-native language of a partial phrase "pet farm" as a cue, via user interface 112, in response to a determination that an audio input matching the phrase stored in local storage 110 "What time will the children be back from the pet farm?" In another example, predictive translation application 108 may play audio of a computer generated voice speaking a partial phrase "basketball game" in a non-native language, via user interface 112, in response to a determination that a monitored audio input matches the stored phrase "What time will the children be back from the basketball game?" In still another example, predictive translation application 108 may play audio in a non-native language of a complete phrase "What time will the children be back from the pet farm?" in response to a determination that an audio input matches a stored phrase "What time will the children be back from the pet farm?"

In other embodiments, predictive translation application 108 presents one or more cues to a user by displaying a visual cue on a screen of user interface 112. For example, predictive translation application 108 may display text of a partial phrase "basketball game" in a chosen non-native language in response to a determination that an audio input matches a stored phrase "What time will the children be back from the basketball game?" In another example, predictive translation application 108 may display a complete phrase "What time will the children be back from the pet farm?" in response to a determination that an audio input matches a stored phrase "What time will the children be back from the pet farm?"

In yet other embodiments, predictive translation application 108 presents multiple cues to a user. For example, predictive translation application 108 may play audio in a non-native language of "pet farm" and display "pet farm" in a non-native language simultaneously in response to a determination that an audio input matches a stored phrase "What time will the children be back from the pet farm?" In another example, predictive translation application 108 may display in a non-native language "pet farm" and "basketball game" in response to a determination that an audio input matches two or more stored phrases, such as "What time will the children be back from the pet farm?" and "What time will the children be back from the basketball game?" In still other embodiments, predictive translation application 108 may present an audio cue for a single exact match and present one or more visual cues for two or more matches. For example, predictive translation application 108 may play audio in a non-native langue of "pet farm" in response to a determination that an audio input matches only "What time will the children be back from the pet farm?" In another example, predictive translation application 108 may display text in a non-native language of "pet farm" and "basketball game" in response to a determination that an audio input matches two or more stored phrases, such as "What time will the children be back from the pet farm?" and What time will the children be back from the basketball game?" In other embodiments, predictive translation application 108 may rank multiple cues by weighting cues using contextual indicators, such as location data, calendar entries, spoken phrases, and language spoken. For example, predictive translation application may rank "pet farm" before "basketball game" based on a calendar entry regarding a school trip to a pet farm.

In response to a determination that one or more audio inputs do not match one or more stored phrases ("NO" branch, 208), predictive translation application 108 may detect a user speaking in a known language (212). Predictive translation application 108 may detect a user speaking in a native language by monitoring the audio inputs for the user speaking a chosen word or phrase in a native language. For example, predictive translation application 108 may record a user speaking a chosen word or phrase in a native, or known, language.

Predictive translation application 108 queries a server for one or more translations (214). In some embodiments, predictive translation application 108 may query a server configured to provide language translations, by presenting input data of a word or phrase to the server and retrieving a translation from the server. In some embodiments of the present invention, predictive translation application 108 transforms the audio input data to digitized text, which is transmitted to the server for translation. In other embodiments, the server is configured to receive audio input data and returns audio and/or visual translations of the audio input data. For example, predictive translation application 108 may transform the audio input of a user to text, and present the text of speech to a server configured to translate text, such as server 104, and retrieve a text translation of speech from the server. In other examples, predictive translation application 108 may present an audio recording or text of speech to server 104 and retrieve an audio recording, computer-generated audio, or text of a translation from server 104. In other embodiments, predictive translation application 108 queries a server by presenting audio input data of a user speaking a chosen word or phrase and contextual indicators, such as location data, calendar entries, spoken phrases, and language spoken, to the server and retrieving one or more translations from the server. For example, predictive translation application 108 may present text of speech and location data to a server, such as server 104, and retrieve a text translation from the server, such as server 104. After retrieving one or more translations from server 104, predictive translation application presents one or more cues to a user (210), as described above.

In some embodiments, predictive translation application 108 may end operation after presenting one or more cues to a user. In other embodiments, predictive translation application 108 may repeat operation after presenting one or more cues to a user. For example, predictive translation application 108 may continue to monitor one or more audio inputs for user speech and user triggers after presenting one or more cues to a user. In another example, predictive translation application 108 may retrieve additional stored phrases from local storage 110 based on contextual indicators, such as location data, calendar entries, spoken phrases, and language spoken, then proceed with the remaining operations.

Figure 3:
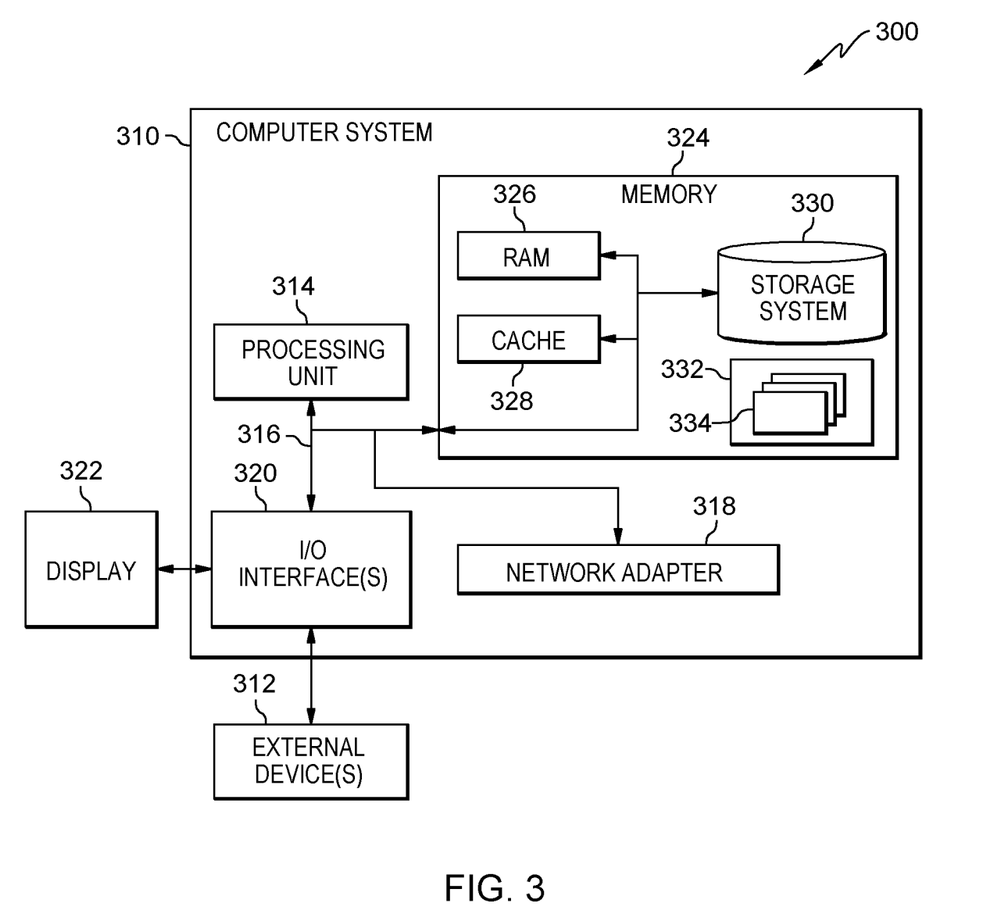
FIG. 3 depicts a block diagram of components of a mobile device, such as the mobile device within the distributed data processing environment of FIG. 1, in accordance with an embodiment of the present invention.

FIG. 3 depicts a block diagram, generally designated 300, of components of distributed data processing environment 100, such as mobile device 106, in accordance with some embodiments of the present invention. It should be appreciated that FIG. 3 provides only an illustration of one implementation and does not imply any limitations with regard to the environments in that different embodiments may be implemented. Many modifications to the depicted environment may be made.

In some embodiments, mobile device 106 in distributed data processing environment 100 is shown in the form of a general-purpose computing device, such as computer system 310. The components of computer system 310 may include, but are not limited to, one or more processors or processing unit 314, memory 324, network adapter 318, Input/Output (I/O) interface(s) 320, and bus 316 that couples various system components including memory 324 to processing unit 314.

Bus 316 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 310 typically includes a variety of computer-readable media. Such media may be any available media that is accessible by computer system 310, and it includes both volatile and non-volatile media, and may include removable and non-removable media.

Memory 324 can include computer-readable media in the form of volatile memory, such as random access memory (RAM) 326 and/or cache memory 328. Computer system 310 may further include other removable/non-removable, volatile/non-volatile computer system storage media, such as storage system 330. For example, storage system 330 may be a hard disk drive or solid state drive, providing non-volatile, persistent storage. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 316 by one or more data media interfaces. As will be further depicted and described below, memory 324 may include at least one computer program product having a set (e.g., at least one) of program modules that are configured to carry out the functions of embodiments of the invention.

By way of example, and not limitation program/utility 332, having one or more sets of program modules 334, may be stored in memory 324, along with an operating system, one or more application programs, other program modules, and program data. Each of the operating systems, one or more application programs, other program modules, and program data, or some combination thereof, may include an implementation of a networking environment. Program modules 334 generally carry out the functions and/or methodologies of embodiments of the invention as described herein. Computer system 310 may also communicate with one or more external device(s) 312 such as a keyboard, a pointing device, a display 322, etc., or one or more devices that enable a user to interact with computer system 310 and any devices (e.g., network card, modem, etc.) that enable computer system 310 to communicate with one or more other computing devices. Such communication can occur via Input/Output (I/O) interface(s) 320. Still yet, computer system 310 can communicate with one or more networks such as a local area network (LAN), a general wide area network (WAN), and/or a public network (e.g., the Internet) via network adapter 318. As depicted, network adapter 318 communicates with the other components of computer system 310 via bus 316. It should be understood that although not shown, other hardware and software components, such as microcode, device drivers, redundant processing units, external disk drive arrays, RAID systems, tape drives, and data archival storage systems may be used in conjunction with computer system 310.

As used herein, "application," "mobile application," or "app" encompasses application software that runs on (or is capable of running on) mobile devices and performs specific tasks for a user of the mobile device. In general, applications encompass any software file comprising instructions that can be understood and processed on a computing device, such as, for example, executable files, library modules, object files, script files, interpreter files, executable modules and the like. An application may be capable of being decompiled (decompiling is a process of translating a file, such as an executable file, containing information at a relatively low level of abstraction, such as assembly language, into a higher level of abstraction that may be human readable, such as programming languages like C++). Applications may include native applications (pre-installed on the mobile device by a vendor) such as address books, calendars, calculators, games, maps, and web browsers. Applications may also be downloaded from a plurality of application software distribution platforms via a network, such as network 102, for execution on a mobile device, such as mobile device 106.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on a computer operated by the user, partly on the user-operated computer, as a stand-alone software package, partly on the user-operated computer and partly on a remote computer or entirely on the remote computer or server. In the latter scenario, the remote computer may be connected to the user-operated computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. It should be appreciated that any particular nomenclature herein is used merely for convenience and thus, the invention should not be limited to use solely in any specific function identified and/or implied by such nomenclature. Furthermore, as used herein, the singular forms of "a", "an", and "the" are intended to include the plural forms as well, unless the context clearly indicates otherwise.

What is claimed is:

1. A method for predictive translation, the method comprising:
   collecting a plurality of audio input data of speech by a user from one or more audio input devices connected to a mobile device of the user, some audio data of the plurality of audio input data being speech in a target language, the target language being learned by the user;
   detecting one or more user triggers in the plurality of audio input data;
   responsive to detecting the one or more user triggers, determining whether other audio data of the plurality of audio input data contain a phrase spoken in a known language of the user;

responsive to a determination that the other audio data contain the spoken phrase in the known language of the user, querying one or more translation servers, configured to provide language translations, for a translation of the spoken phrase in the known language into a translated phrase in the target language, by:
  presenting the other audio data containing the spoken phrase in the known language to the one or more translation servers; and
  identifying the target language to the one or more translation servers;
receiving the translated phrase in the target language, including a phrase portion, from the one or more translation servers;
presenting the phrase portion in the target language to the user via the mobile device;
monitoring a second plurality of audio input data of the user while reciting the spoken phrase in the target language including the phrase portion for a pause in speech;
responsive to detecting the pause in speech when reciting the spoken phrase in the target language presenting the translated phrase in the target language, including the phrase portion, to the user.

2. The method of claim 1, further comprising
determining whether the others of the plurality of audio input data match at least one of one or more stored phrases;
responsive to a determination that the plurality of audio input data match at least one of the one or more stored phrases, presenting one or more cues to the user via the mobile device.

3. The method of claim 2, wherein determining whether the others of the plurality of audio input data match at least one of the one or more stored phrases, further comprises:
  responsive to a determination that the others of the plurality of audio input data include content and one or more contextual indicators that relate to the one or more stored phrases, determining, by the one or more computer processors, the others of the plurality of audio input data match the one or more stored phrases.

4. The method of claim 3, wherein determining whether the others of the plurality of audio input data match at least one of the one or more stored phrases, further comprises:
  responsive to a determination that the others of the plurality of audio input data include content and one or more contextual indicators that do not relate to the one or more stored phrases, determining, by the one or more computer processors, the others of the plurality of audio input data do not match the one or more stored phrases.

5. A computer program product for predictive translation, the computer program product comprising:
  one or more computer readable storage devices and program instructions stored on the one or more computer readable storage devices, the stored program instructions comprising:
  program instructions to collect a plurality of audio input data of speech by a user from one or more audio input devices connected to a mobile device of the user, some audio data of the plurality of audio input data being speech in a target language, the target language being learned by the user;
  program instructions to detect one or more user triggers in the plurality of audio input data;
  program instructions to, responsive to detecting the one or more user triggers, determine whether other audio data of the plurality of audio input data contain a phrase spoken in a known language of the user;
  program instruction to, responsive to a determination that the other audio data contain the spoken phrase in the known language of the user, querying one or more translation servers, configured to provide language translations, for a translation of the spoken phrase in the known language into a translated phrase in the target language, by:
    presenting the other audio data containing the spoken phrase in the known language to the one or more translation servers; and
    identifying the target language to the one or more translation servers;
  program instructions to receive the translated phrase in the target language, including a phrase portion, from the one or more translation servers;
  program instructions to present the phrase portion in the target language to the user via the mobile device,
  program instructions to monitor a second plurality of audio input data of the user while reciting the spoken phrase in the target language including the phrase portion for a pause in speech;
  program instruction to, responsive to detecting the pause in speech when reciting the spoken phrase in the target language presenting the translated phrase in the target language, including the phrase portion, to the user.

6. The computer program product of claim 5, further comprising:
  program instruction to determine whether the others of the plurality of audio input data match at least one of one or more stored phrases;
  program instructions to, responsive to a determination that the plurality of audio input data match at least one of the one or more stored phrases, present one or more cues to the user via the mobile device.

7. The computer program product of claim 6, wherein determining whether the others of the plurality of audio input data match at least one of the one or more stored phrases, further comprises:
  program instructions to, responsive to a determination that the others of the plurality of audio input data include content and one or more contextual indicators that relate to the one or more stored phrases, determine the others of the plurality of audio input data match the one or more stored phrases.

8. The computer program product of claim 7, wherein determining whether the others of the plurality of audio input data match one or more stored phrases, further comprises:
  program instruction to, responsive to a determination that the others of the plurality of audio input data include content and one or more contextual indicators that do not relate to the one or more stored phrases, determine the others of the plurality of audio input data do not match the one or more stored phrases.

9. A computer system for predictive translation, the computer system comprising:
  one or more computer processors;
  one or more computer readable storage devices;
  program instructions stored on the one or more computer readable storage devices for execution by at least one of the one or more computer processors, the stored program instructions comprising:
  program instructions to collect a plurality of audio input data of speech by a user from one or more audio input devices connected to a mobile device of the user, some audio data of the plurality of audio input data being speech in a target language, the target language being learned by the user;

program instructions to detect one or more user triggers in the plurality of audio input data;

program instruction to, responsive to detecting the one or more user triggers, determine whether other audio data of the plurality of audio input data contain a phrase spoken in a known language of the user;

program instruction to, responsive to a determination that the other audio data contain the spoken phrase in the known language of the user, querying one or more translation servers, configured to provide language translations, for a translation of the spoken phrase in the known language into a translated phrase in the target language, by:
- presenting the other audio data containing the spoken phrase in the known language to the one or more translation servers; and
- identifying the target language to the one or more translation servers;

program instructions to receive the translated phrase in the target language, including a phrase portion from the one or more translation servers;

program instructions to present the phrase portion in the target language to the user via the mobile device;

program instructions to monitor a second plurality of audio input data of the user while reciting the spoken phrase in the target language including the phrase portion for a pause in speech;

program instruction to, responsive to detecting the pause in speech when reciting the spoken phrase in the target language presenting the translated phrase in the target language, including the phrase portion, to the user.

10. The computer system of claim 9, further comprising:

program instruction to determine whether the others of the plurality of audio input data match at least one of one or more stored phrases;

program instructions to, responsive to a determination that the plurality of audio input data match at least one of the one or more stored phrases, present one or more cues to the user via the mobile device.

11. The computer system of claim 10, wherein determining whether the others of the plurality of audio input data match at least one of the one or more stored phrases, further comprises:

program instructions to, responsive to a determination that the others of the plurality of audio input data include content and one or more contextual indicators that relate to the one or more stored phrases, determine the others of the plurality of audio input data match the one or more stored phrases.

12. The computer system of claim 11, wherein determining whether the others of the plurality of audio input data match one or more stored phrases, further comprises:

program instructions, responsive to a determination that the others of the plurality of audio input data include content and one or more contextual indicators that do not relate to the one or more stored phrases, determine the others of the plurality of audio input data do not match the one or more stored phrases.

\* \* \* \* \*